United States Patent [19]

Kuzas

[11] Patent Number: 4,829,815

[45] Date of Patent: May 16, 1989

[54] TIRE TESTING APPARATUS

[75] Inventor: George S. Kuzas, Stow, Ohio

[73] Assignee: The Firestone Tire & Rubber Company, Akron, Ohio

[21] Appl. No.: 194,061

[22] Filed: May 13, 1988

[51] Int. Cl.[4] ........................................... G01M 17/02
[52] U.S. Cl. ........................................ 73/146; 384/901
[58] Field of Search ............ 73/146, 117, 8, 9, 862.09; 33/203.13; 384/901

[56] References Cited

U.S. PATENT DOCUMENTS

| | | | |
|---|---|---|---|
| 1,402,794 | 1/1922 | Reese | 384/901 |
| 1,600,071 | 9/1926 | Shaifer | 384/901 |
| 2,577,942 | 12/1951 | Agins | 74/5 |
| 2,970,480 | 2/1961 | Zeigler | 74/5 |
| 2,983,556 | 5/1961 | Coan | 308/183 |
| 3,116,628 | 4/1964 | Gordon | 73/9 |
| 3,167,958 | 2/1965 | Hollmann | 73/231 |
| 3,365,596 | 1/1965 | Jones | 310/66 |
| 3,498,125 | 8/1970 | Sperberg | 73/146 |
| 3,543,576 | 12/1970 | Bishop | 73/146 |
| 3,715,909 | 2/1973 | Wolanin | 73/9 |
| 3,948,095 | 4/1976 | Burgett | 73/146 |
| 4,038,863 | 8/1977 | Mellor | 73/9 |
| 4,171,641 | 10/1979 | Landsness | 73/146 |
| 4,233,838 | 11/1980 | Stiebel | 73/146 |
| 4,235,092 | 11/1980 | Spall | 73/9 |
| 4,238,954 | 12/1980 | Langer | 73/146 |
| 4,324,128 | 4/1982 | Langer | 73/8 |
| 4,489,598 | 12/1984 | Beebe et al. | 73/146 |

Primary Examiner—Donald O. Woodiel
Attorney, Agent, or Firm—Ernst H. Ruf

[57] ABSTRACT

A tire testing machine for measuring rolling resistance of a pneumatic tire by bringing a freely rotatably mounted tire into contact with a driven rotating load wheel. Spindles of the tire mounting structure and load wheel are supported in bearing assemblies. Each of the bearing assemblies includes an inner race rotatable with the spindle and an outer race mounted on a cylindrical sleeve. The sleeves are rotatably supported by an outer bearing assembly within a stationary housing. The speed of the sleeve and correspondingly the speed of the outer race is "slaved" to the speed of the associated spindle and inner race by drive motors whereby no relative motion exists between the bearing races and intervening bearing elements thereby negating bearing friction and associated losses. Elimination of bearing losses enables a more accurate and constant rolling resistance to be measured by the tire test machine. Encoders measure the rotational speeds of the spindles and sleeves and generate control signals in response thereto which are supplied to a control module which then controls the speeds of the various drive motors.

20 Claims, 8 Drawing Sheets

TIRE TESTING APPARATUS

TECHNICAL FIELD

The invention relates to apparatus for determining the rolling resistance of tires, and in particular to such an apparatus in which friction bearing losses are accounted for and subtracted from the system torque requirements to establish a more accurate rolling resistance measurement. More particularly the invention relates to such an improved tire testing apparatus in which bearing friction is effectively eliminated by rotating the outer race of the supporting bearings at approximately the same speed as the inner race thereby eliminating relative motion between the bearing elements and, accordingly, eliminating bearing losses.

BACKGROUND ART

In the manufacture of tires and in particular pneumatic tires used for passenger vehicles, trucks, etc., the tires are subjected to a tire rolling resistance measurement test to insure that the same meet certain test standards. These measurements normally are taken by bringing a freely rotatably mounted tire into contact with a driven load wheel or wheels, and by the use of load cells calculate the amount of resistance to the rolling movement of the tire. These prior art tire testing apparatus require numerous load cell calibrations and checks as well as various computations in order to insure that the test results are accurate.

One factor effecting these prior art test results is the friction that is naturally present in the bearing mountings of both the test tire and the load wheel or wheels. The friction present in the various bearings have a definite effect on the accuracy of the tests being performed. These friction forces provide an inherent error in the tire test machine or apparatus. Therefore, to obtain more accurate tests, the friction losses must be measured by the use of load cells or other devices for each tire test machine and for each of the various sizes of tires being tested, as well as for the various rotational speeds at which the tests are being perfomred. These determinations have to be checked periodically due to the natural changes in the friction forces as the testing apparatus and associated mounting bearings age and wear throughout the life of the apparatus. All of these tests and calculations increase considerably the time and cost of performing the rolling resistance tests on the tires.

Some examples of prior art tire testing machines and apparatus are shown in U.S. Pat. Nos. 3,498,125; 3,543,576; 3,948,095; 4,171,641; 4,233,838; 4,238,954 and 4,324,128. However, none of these known prior art tire test machines and apparatus provide any means for negating the undesirable effect of the friction forces in the bearings as achieved by my invention hereinafter described.

Certain prior art devices have been developed for negating the influence of bearing friction, none of which, however, have been used or proposed for use in tire test equipment.

U.S. Pat. No. 3,167,958 shows a support arrangement for a flow meter wherein the same is provided with eccentric bearing supports and a mounting arrangement which will prevent or reduce friction loss because the outer rotary element is slaved to the inner rotary element whereby little or no movement takes place in the inner rotary element relative to the outer rotary means.

A somewhat similar bearing arrangement with respect to a center shaft is shown in U.S. Pat. No. 3,365,596.

U.S. Pat. Nos. 2,577,942; 2,970,480 and 2,983,556 show devices which attempt to eliminate a bearing friction problem in the gyroscope art wherein the gyroscope support utilizes concentrically disposed bearing supports to lessen or eliminate this problem of bearing friction.

U.S. Pat. No. 4,235,092 discloses an apparatus for measuring the running torque of a bearing under a radial load by utilizing a balanced radial force on the bearing.

U.S. Pat. Nos. 3,116,628; 3,715,909 and 4,038,863 disclose various apparatus and devices for measuring bearing friction, none of which propose the particular solution to eliminating such bearing friction as in my invention.

DISCLOSURE OF THE INVENTION

Objectives of the invention include providing an improved tire testing apparatus of the type in which a tire to be tested is freely rotatably mounted on a spindle for moving the tire into engagement with a driven load wheel or wheels whereby various measurements can be taken to determine the rolling resistance of the outer tire surface; and in which more accurate measurements can be achieved by eliminating the inherent rolling friction in the bearings which rotatably mount the test tire and the load wheel or wheels.

Another objective of the invention is to provide such an improved tire testing apparatus in which the spindles on which the test tire and load wheels are mounted are supported by two pairs of bearing members; and in which an inner race of an inner bearing member is secured to the spindle and the outer race is secured to an intermediate sleeve which is rotated at a speed approaching that of the inner race thereby effectively eliminating any motion on the bearing races and intervening bearing balls to negate any friction therebetween which would affect the measurements of the various torque, power, etc. that is required for the tire tests.

A further objective of the invention is to provide such a tire testing apparatus in which the rotational speed of the bearing inner races is measured by encoders or proximity switches which produce signals that are supplied to appropriate control mechanisms which, in turn, provide control signals to other motors which are operatively connected to the outer races of the associated bearing members for rotating the outer races at a speed approximating the speed of the inner races; and in which other speed detection encoders associated with the outer race drive motors, provide check signals which also are supplied to a central control module to insure that the system is operating as intended.

Still another objective of the invention is to provide such an improved tire testing apparatus in which the inner bearing members in which the friction is negated as described above, are in turn supported by outer bearing members which mount the inner bearing members and intermediate sleeves within stationary housings to provide a completely self-contained and supported tire testing apparatus.

A still further objective of the invention is to provide such an improved tire testing apparatus which will eliminate the effects of bearing friction on the test results regardless of the particular diameter and tread configuration of the tire being tested, and will provide test results unaffected by the age and wear condition of the particular bearing members since the speeds of the inner and outer races are matched so that they are free of relative movement therebetween.

A still further objective of the invention is to provide such an improved tire testing apparatus in which the general principles and construction of existing tire test equipment and machines may be utilized and generally require only the replacement of the bearing mounting members for the tire test spindle and load wheels and by incorporation of the appropriate control mechanisms and control module.

These objectives and advantages are obtained by the improved tire testing apparatus of the invention, the general nature of which may be stated as including at least one rotatable load wheel mounted on a spindle; tire holding means for rotatably mounting a tire and for moving said tire into engagement with the load wheel; motor means for rotating the load wheel spindle; a bearing member having inner and outer races rotatably supporting the load wheel spindle at each end of said spindle, said inner races being rotatable with said load wheel spindle; first means for determining the rotational speed of said inner races; and second means for rotating the outer races of the bearing members at a speed generally equal to the rotational speed of the inner races to negate friction losses in the bearing member.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
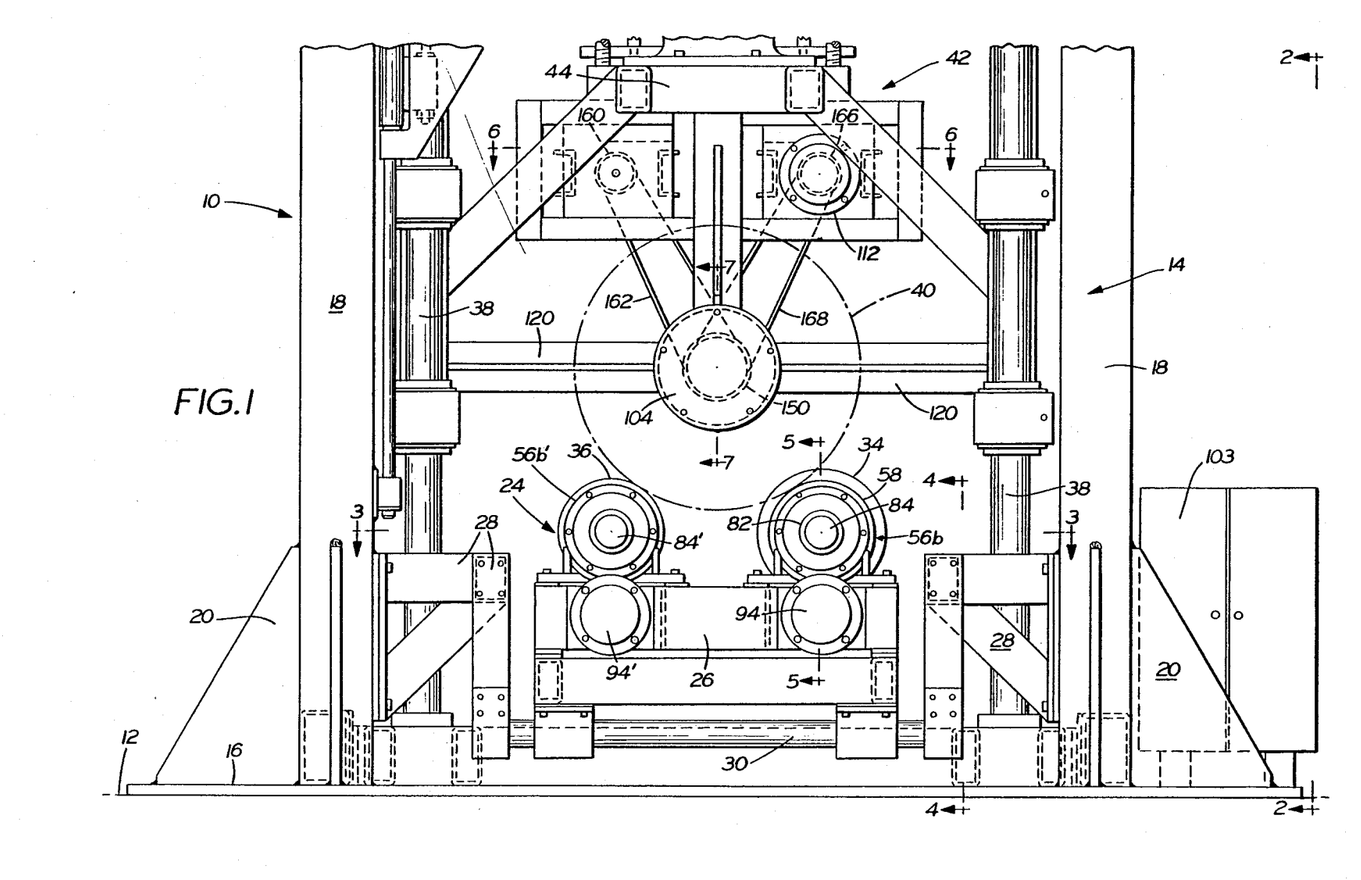
FIG. 1 is frontal view of a portion of the improved tire testing apparatus of the present invention.
Figure 2:
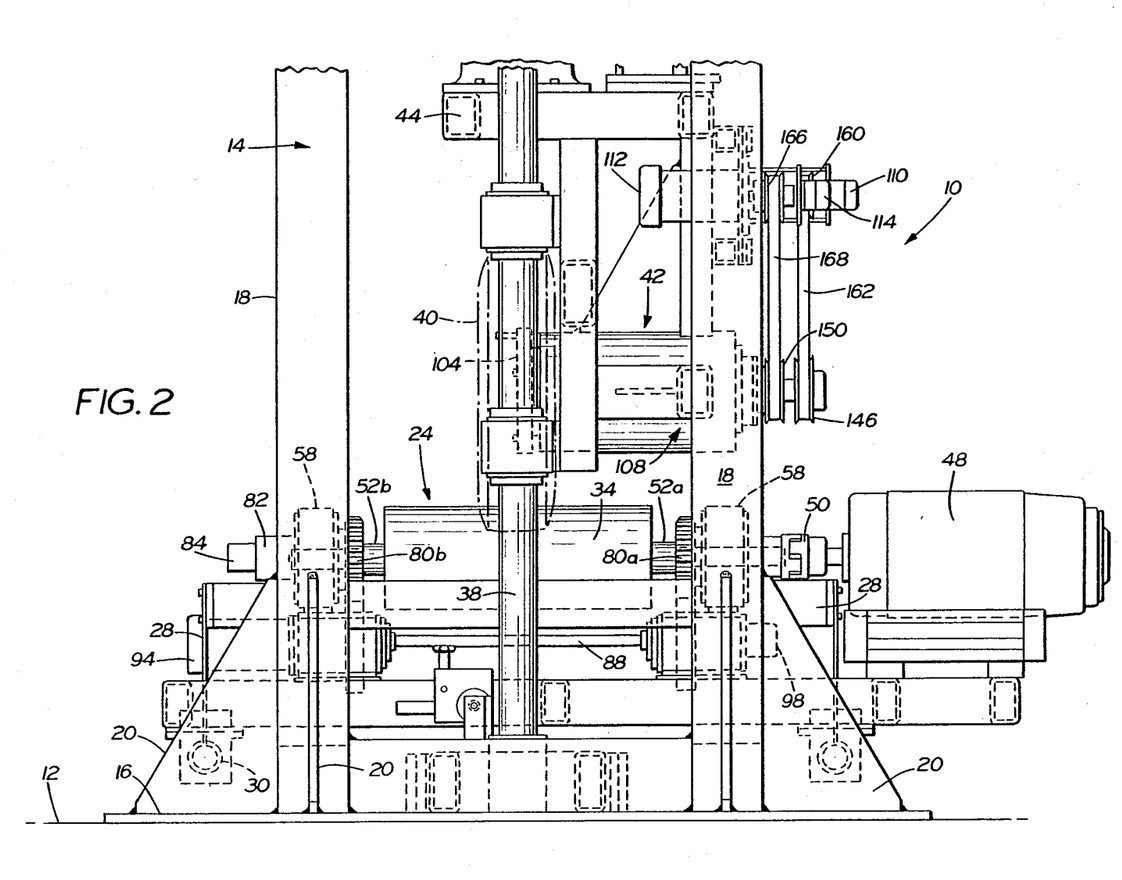
FIG. 2 is a side view of the portion of the improved tire testing apparatus as shown in FIG. 1.

Referring now to the drawings, specifically FIGS. 1 and 2, there is illustrated an apparatus 10, for the testing of tires, rigidly mounted on a foundation or base 12. Apparatus 10 includes a frame 14, having a base plate 16, which in turn has four spaced, vertical, stiff beams 18 attached thereto and reinforced by gussets 20. The upper ends of beams 18 are connected by transverse beams (not shown) so as to make frame 14 quite rigid.

Figure 3:
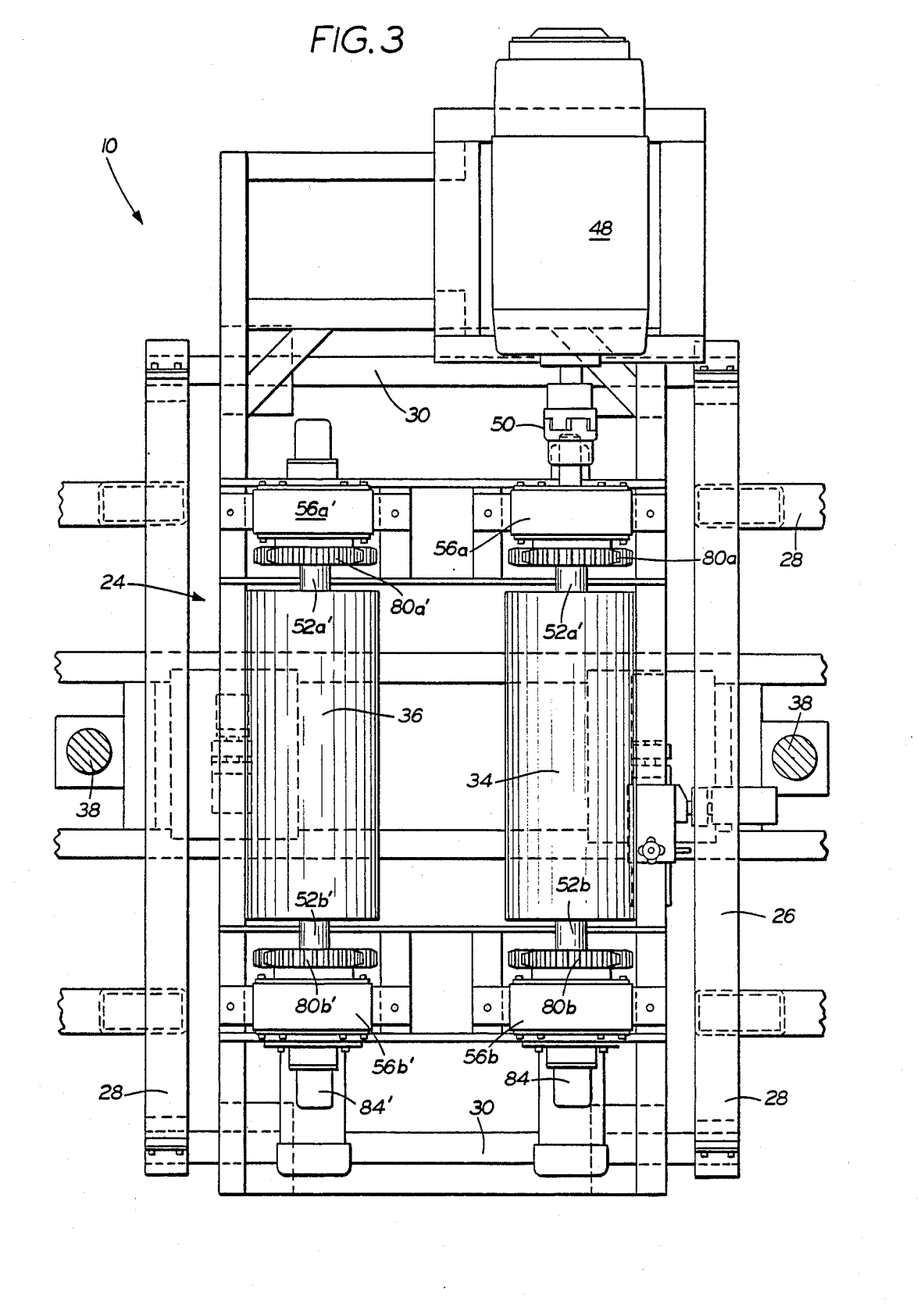
FIG. 3 is a simplified cross-sectional view, taken along line 3—3 of FIG. 1, showing some of the constructional details of the dual load wheels of the present invention.
Figure 4:
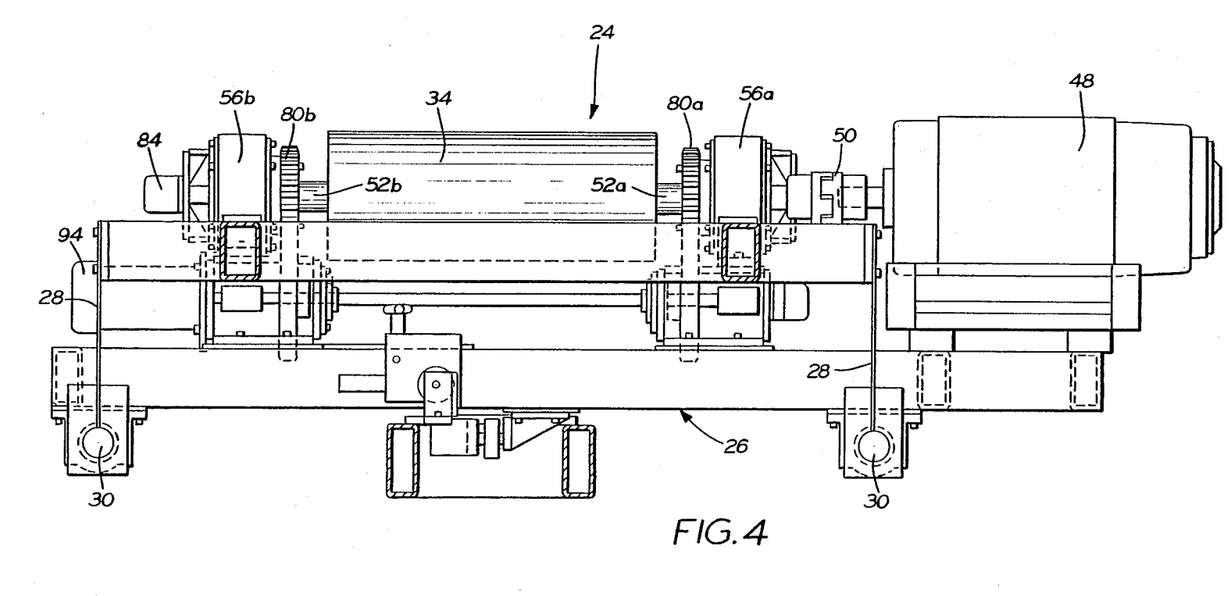
FIG. 4 is a simplified cross-sectional view, taken along line 4—4 of FIG. 1, which again shows some of the constructional details of the dual load wheels of the present invention.

As best seen in FIGS. 1 and 3, a dual road or dual load wheel assembly 24 is mounted on a subframe 26, which in turn, is attached to beams 18 via multiple support members 28 and support rods 30. The dual load wheel assembly 24 is comprised of a driven load wheel 34 and an idler load wheel 36, both of which will be discussed more fully hereinafter.

Returning now to FIGS. 1 and 2, attached to and ascending from base plate 16 are transversely spaced cylindrical vertical columns 38 that serve to adjustably and rotatably support the tire 40 (best seen in FIGS. 2 and 7) to be tested together with its holding means 42, which will also be discussed more fully hereinafter. Columns 38 further adjustably support tire loading means 44 (not fully shown) rigidly connected and axially aligned with tire holding means 42.

Even though tire testing apparatus 10 is shown as utilizing a dual or twin load wheel assembly 24, it could also utilize but a single load wheel in the manner well known in the prior art as exemplified in U.S. Pat. No. 3,948,095 to Burgett, et al., and U.S. Pat. No. 4,233,838 to Stiebel, for example. Furthermore, if desired, either the tire to be tested may be driven as set forth in noted U.S. Pat. No. 3,948,095 or the load wheel may be driven as set forth in noted U.S. Pat. No. 4,233,838.

In terms of operation, again as well known in the art, the tire holding means 42, together with tire loading means 44, may be moved toward or away from load wheel assembly 24 to thereby engage or disengage tire 40 with load wheels 34 and 36. Since either the tire or one of the load wheels is driven and the other rotates freely, they will of course rotate together upon engagement therebetween.

Figure 5A:
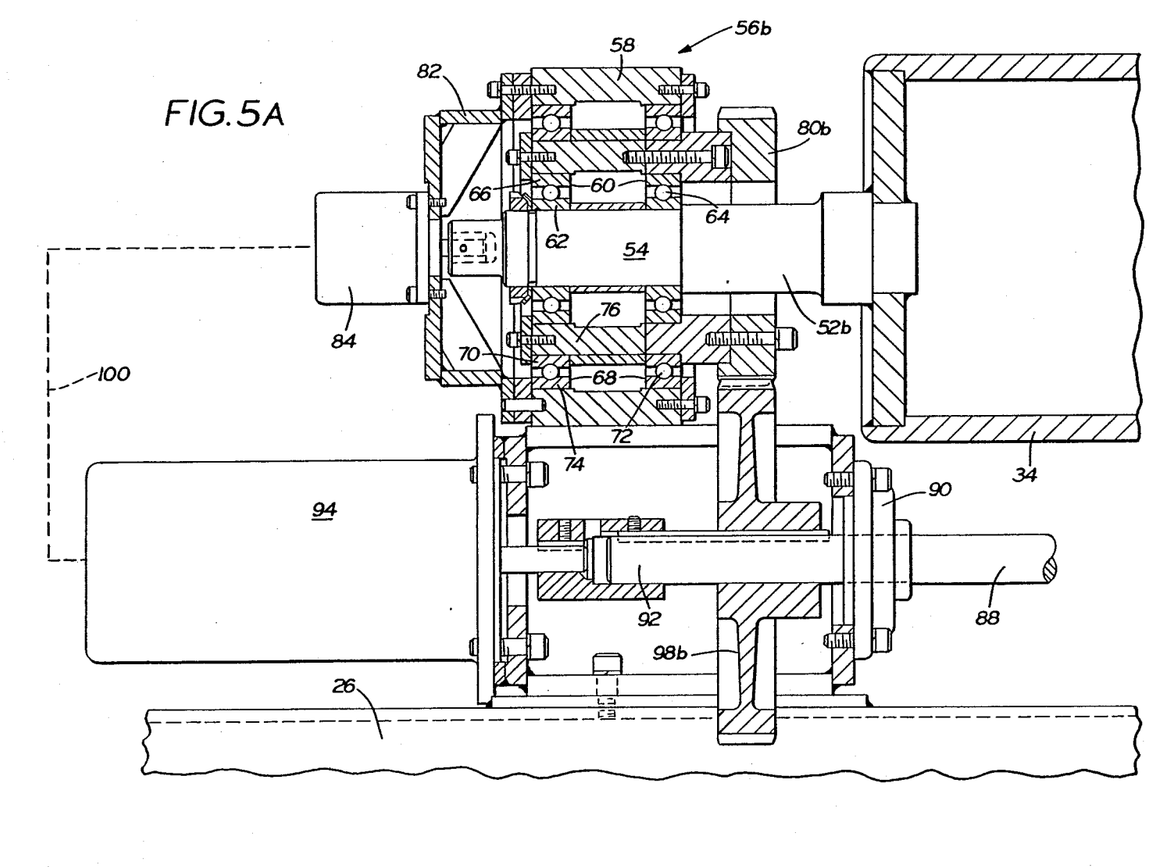
FIGS. 5A and 5B are cross-sectional views, taken along line 5—5 of FIG. 1, showing the two journaled ends of the driven load wheel, broken in the center.
Figure 5B:
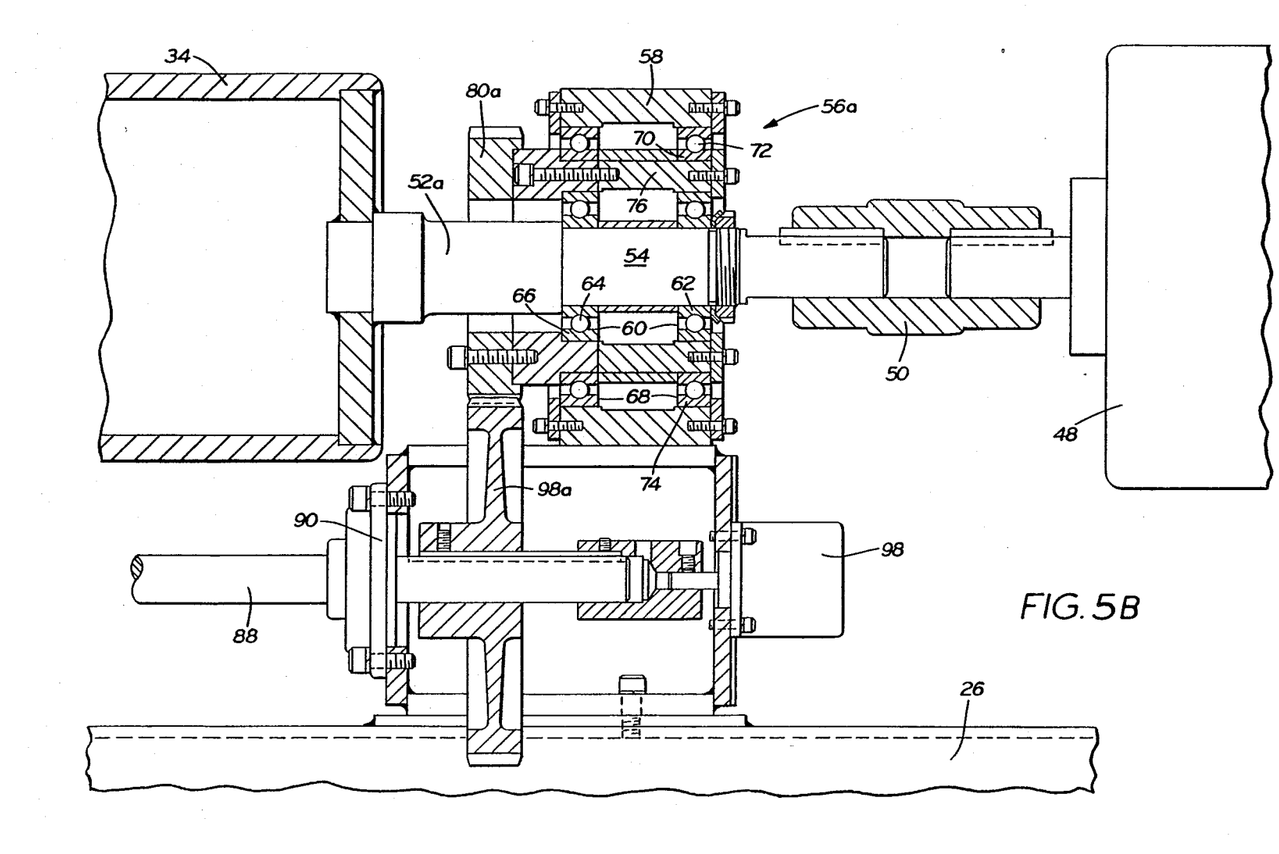

Turning now to the details of dual load wheel assembly 24, as best seen in FIGS. 3, 5A and 5B, load wheel 34 is driven via a prime mover 48, such as an electric motor, that is interconnected via coupling 50 to the outer end of one of substantially similar support axle or spindle ends 52a, 52b laterally extending from the opposed hubs of load wheel 34. Journal portions 54 of spindle ends 52a, 52b are rotatedly journaled in a bearing assembly 56 having a stationary outer housing 58, a pair of spaced inner rolling element bearings 60, a pair of concentric, spaced outer rolling element bearings 68, and a rotatable intermediate sleeve member 76 interposed between bearings 60 and 68.

Each one of inner journal bearings 50 consists of an inner race 62 securely mounted on spindle journal portion 54, engaged by rolling elements 64 and circled by outer race 66, which in turn is securely mounted on the inner peripheral surface of intermediate sleeve member 76. Each one of outer journal bearings 68 consists of an inner race 70 securely mounted on the outer peripheral surface of sleeve member 76, engaged by rolling elements 72 and circled by outer race 74, which in turn is securely mounted on the inner peripheral surface of stationary housing 58. Since bearing assembly 56b is the same as bearing assembly 56a, like numerals have been applied to like parts. In addition, rotatable sleeves 76 of assemblies 56a (FIG. 5B) and 56b (FIG. 5A) have an annular gear member 80a and 80b, respectively, attached to their inner hub surfaces for conjoint rotation therewith. Furthermore, stationary outer housing 58 of bearing assembly 56b is provided with a laterally extending end cap portion 82 to which is attached an encoder 84, driveably connected with the outer end portion of spindle end 52b, to provide a means for determining the rate of rotation of spindle 52, and therefore, of load wheel 34, in a manner old and well known in the art.

As best seen in FIGS. 5A and 5B, a shaft 88, parallel with load wheel 34 is rotatably secured via bearing assemblies 90, attached to wheel assembly subframe 26. Shaft 88, which is substantially parallel with and located vertically below a driven load wheel 34, has end 92 thereof physically coupled with prime mover 94 in the general area below bearing assembly 56b. The other end 96 of shaft 88 terminates in the general area below bearing assembly 56a and is driveably connected with a further encoder 98 to provide means for determining the rate of rotation of shaft 88. Physically attached to and rotatable with shaft 88 are gears 98a, 98b that are in a meshing relationship with gear members 80a, 80b, respectively. Dotted line 100 between encoder 84 and prime mover 94 signifies that in a control system (not shown), the output from encoder 84 is used to control the rate of rotation of prime mover 94 in a manner to be discussed further hereinafter. The various controls may be contained within a control module, microprocessor or the like located within a control cabinet 103 such as shown in FIG. 1.

It should be noted that idler load wheel 36, as best seen in FIG. 3, is substantially the same as previously described load wheel 34 and therefore identical in structure to that shown in FIGS. 5A and 5B, with the shown parts thereof in FIG. 3 being denoted the same as those of load wheel 34 with the addition of prime (') added to the numbers. The sole structural exception is that since load wheel 36 is an idler wheel the outer end of spindle end 52a' is of course not connected with a prime mover.

Figure 6:
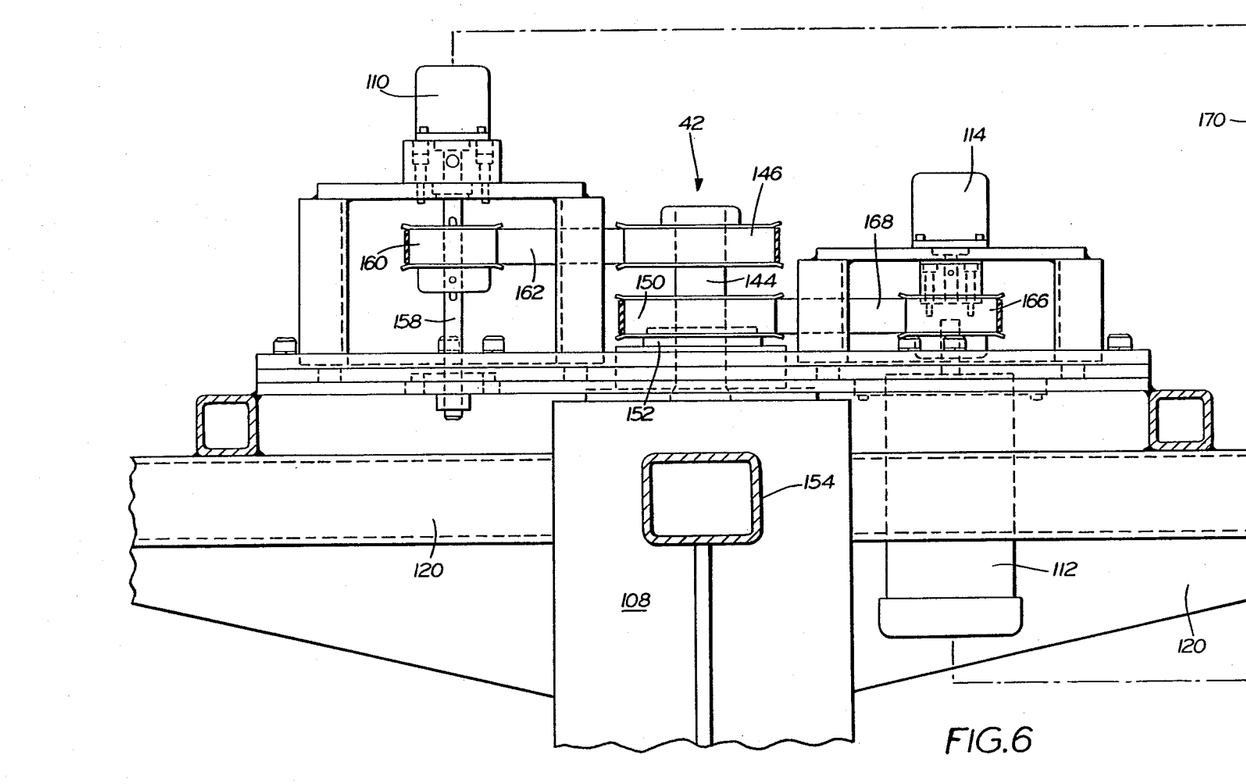
FIG. 6 is a simplified cross-sectional view, taken along line 6—6 of FIG. 1, showing some of the constructional details associated with the tire support spindle.
Figure 7:
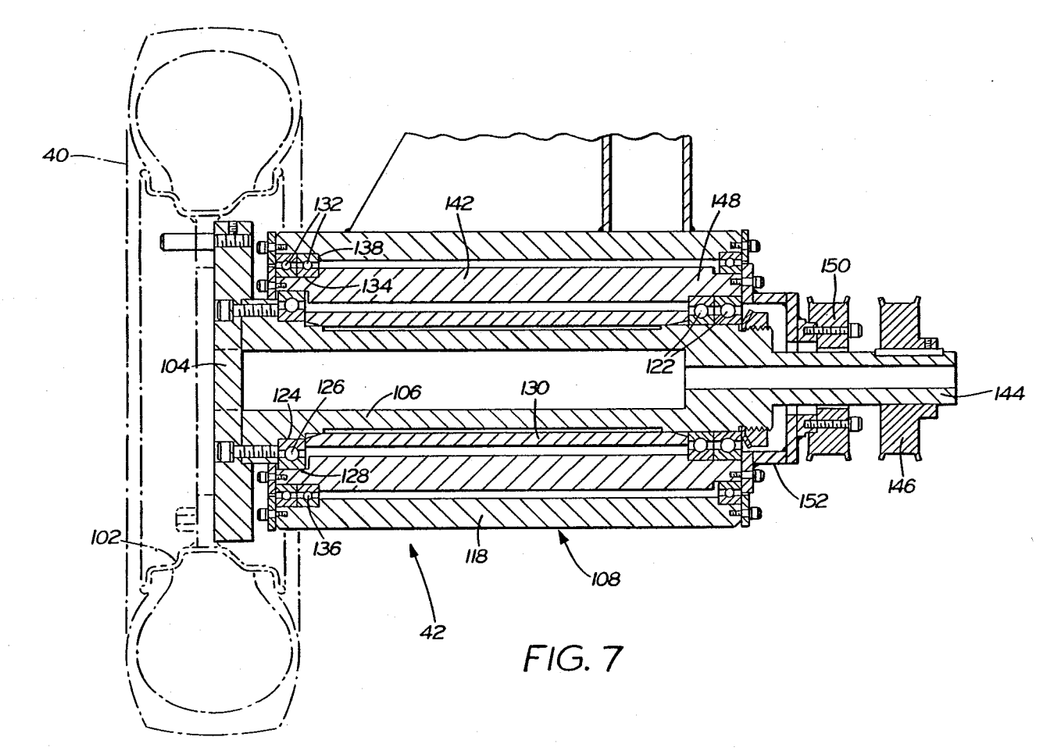
FIG. 7 is a simplified cross-sectional view, taken along line 7—7 of FIG. 1, showing details of the tire spindle support structure.

Turning now to the tire to be tested, FIGS. 1, 2 and 7 schematically show the tire 40 together with its holding means 42, which will now be discussed in more detail. As best shown in FIG. 7, a schematically shown tire 40 is mounted on a schematically shown rim 102, located on and secured to an end plate 104, which in turn is secured to one end of a rotatable stepped central spindle 106. Spindle 106 forms part of tire holding means 42 which further includes bearing assembly 108, and (as best seen in FIG. 6) spindle encoder 110, prime mover 112 and control encoder 114.

Returning now to FIG. 7, bearing assembly 108 includes a stationary outer housing 118 that is adjustably supported, relative to vertical columns 28, via support members 120 (FIG. 1), among others. Stepped central spindle 106 is journaled in housing 118 via at least one or more pairs of spaced inner rolling element bearings 122, concentric with at least one or more spaced pairs of outer rolling element bearings 132, radially separated from each other via an intermediate rotatable sleeve member 142.

The inner races 124 of bearings 122 are securely mounted on outer surface portions of central spindle 106 and engaged by rolling elements 126 encircled by other races 128 which in turn are securely mounted on inner surface portions of intermediate sleeve member 142. A cylindrical member 130 serves the function of a spacer between axially separated ones of bearings 122. Spaced pairs of outer rolling element bearings 132 have their inner races 134 securely mounted on outer surface portions of intermediate sleeve member 142 and are engaged by rolling elements 136 encircled by outer races 138 which in turn are securely mounted on inner surface portions of stationary housing 118. Spaced pairs of bearings 122 and 132 are necessary due to the cantilever-type mounting of tire 40 on end plate 104.

Stepped portion 144 of spindle 106, on the end opposite of end plate 104, has a drive sheave or pulley wheel 146 physically attached thereto with the proximate end 148 of intermediate sleeve member 142 having a similar sheave 150 physically attached thereto via intermediate cap portion 152.

Also physically attached to the tire holding means 42, via member 154, among others, including tire loading means 44, are further components of the tire holding means 42 (FIG. 6), namely spindle encoder 110, prime mover 112 and control encoder 114. Spindle encoder 110 is driveably connected with rotatably journaled shaft 158 which also has a sheave 160 attached thereto so as to permit the rotation of shaft 158 via a drive member 162, such as a belt, secured beween sheaves 146 and 160. It is the function of spindle encoder 110 to determine the rate of rotation of central spindle 106 of the tire holding means.

Prime mover 112 has a sheave 166 connected with its output shaft which in turn is connected, via a drive member or belt 168, with sheave 150 attached to intermediate sleeve 142. The rate of rotation of prime mover 112 is measured by control encoder 114 driveably connected with sheave 166. Broken line 170, extending between spindle encoder 110 and prime mover 112, is symbolic of the fact that the former functions to control the latter in the manner to be described hereinafter.

Tire 40 is mounted on tire holding means 42 in a manner well known in the art and tire support loading means 44 is actuated moving the tire into contact with load wheels 34 and 36 as shown in FIG. 1. Load wheel drive motor 48 is actuated which rotates driven load wheel 34 and correspondingly will rotate idler load wheel 36 and engaged pneumatic tire 40. Strain gauges (not shown) which are incorporated into tire holding means 42, which are well known in the art and therefore are not described in detail, determine the load that is exerted between tire 40 and load wheels 34 and 36. Encoder 84 (FIG. 5A) measures the rotational speed of spindle end 52b and supplies a signal which is fed to an appropriate control system. The control system may consist of various microprocessors, computers, or the like, and may be located adjacent apparatus 1 in a control cabinet 103 as shown in FIG. 1. The particular control system and components thereof may vary and are of types well known to those skilled in the art and therefore are not described in detail.

Referring to FIG. 5A, the signal from encoder 84 is transmitted by the control system to motor 94 which through the meshing of gears 98b and 80b will rotate outer race 66 through intermediate sleeve 76 at a rotational speed slightly below the rotational speed of inner race 62, which is rotating at the same rotational speed as is spindle end 52b. Generally matching the rotational speed of inner race 62 with that of outer race 66 will effectively place rotating elements 64 without any movement between the inner and outer races thereby effectively negating any friction within the inner bearing 60. This same effect is achieved at the opposite end of the spindle and, in particular, spindle end 52a as shown in FIG. 5B, by transmitting the rotational speed of motor 94 through shaft 88 and through meshing gears 98a and 80a. Encoder 98, coupled with shaft 88, provides another signal which checks the rotational speed of the prime mover to ensure that it coincides with the signal provided by encoder 84 connected to load wheel spindle 52b. Sleeve 76, in turn, is rotatably supported by outer bearing member 68 within stationary housing 58. Thus, the friction heretofore exerted on the inner bearing and correspondingly which would affect the test data derived from driven load wheel 34, is transmitted to the outer bearing member 68 and, therefore, does not effect the readings and results achieved by driven load wheel 34.

Referring to FIGS. 6 and 7, this same friction negation is achieved on tire holding means 42. The rotational speed of pneumatic tire 40, which is driven through its pressure engagement with driven load wheel 34, is measured by encoder 110. Encoder 110 is operatively connected to spindle 106 through sheaves 160 and 146 and timing belt 162 through the connection of sheave 146 on stepped portion 144 of spindle 106 which is connected to end plate 104. Encoder 110 supplies a signal through the appropriate control mechanism to the control module which is then, in turn, supplied to motor 112. This transmission of the signal is represented by broken line 170 in FIG. 6. In effect, the output signal of spindle 110 is fed to the control mechanism which is then fed to motor 112 instead of directly thereto as represented by broken line, which is being shown in the manner of FIG. 6 for illustrative purposes only.

Motor 112 then will rotate intermediate sleeve 142 and correspondingly outer race 128 of bearing 122 at the same speed as inner race 124, which is connected to spindle 106. Sleeve 142 is rotated through sheave 166 through timing belt 168. Thus, the rotation of sleeve 142 and correspondingly outer race 128 at the same speed of inner race 124 will effectively place rolling elements or bearing balls 126 without movement thereby negating any friction in bearing 122 which rotatably mounts tire 40. Again, the bearing friction is effectively transmitted to the outer bearing 132 which rotatably supports sleeve 142 within stationary outer housing 118.

A control encoder 114 is mounted on the output end of the drive shaft of motor 112 to measure the rotation of the drive motor to serve as a further check to ensure that the rotation thereof is equal to or slightly less than the rotation of tire mounting spindle 106. Thus, encoders 84 and 110 function as detectors for determining the speeds of rotation of the driven load wheel spindle and tire mounting spindle which in turn, supply signals to the appropriate control mechanism which supply control signals to the appropriate drive motors 94 and 112 for controlling the speed of the sleeves 76 and 142 to negate the friction of the inner bearing members.

The various shaft mounted encoders described above and shown in the drawings can easily be replaced by a proximity switch which is located adjacent to a gear mounted on the appropriate shaft, which construction is a well known substitute in the art for the encoders. Therefore, the invention need not be limited to the use of encoders, but other types of detection means can be used. Also, it has been found that other types of support bearings may be used, especially those which rotatably support the intermediate sleeves within the stationary outer housings for additional support, and need not be the particular ball bearing members as shown in the drawings and described above.

It is desired that secondary drive motors 94 and 112 impart an rpm to the associated bearing sleeve to lag slightly behind the rotational speed of the prime drive motors 34 and the speed of tire mounting spindle 106. This relationship avoids slip-stick friction and avoids overdriving the race, which would have the effect of adding energy to the system which is undesirable.

In summary, the improved apparatus provides a prime mover which drives the main shaft of the load wheel through coupled gears in a first direction and a secondary motor drives the outer races of the bearings which are utilized to rotatably support the main support shaft or spindle in the housing at a speed approaching, but slightly less than the speed of the main shaft and inner races, so that there is only a very small (if any) relative motion between the inner and outer races, thereby substantially negating bearing loss. Also control is achieved via a pulse unit (encoder) that measures the main shaft rpm and then controls the secondary motor to approach the rpm of the main shaft and prime mover. This same arrangement is used in the bearing mounting structure of the pneumatic tire holder and rotational means to negate any friction in the rotating tire.

Accordingly, the improved tire testing apparatus is simplified, provides an effective, safe, inexpensive, and efficient apparatus which achieves all the enumerated objectives, provides for eliminating difficulties encountered with prior apparatus, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tire testing apparatus is constructed and used, the characteristics of the construction, and the advantageous, new and useful results obtained; the new and useful structures, devices, elements, arrangements, parts, and combinations, are set forth in the appended claims.

What is claimed is:

1. In an apparatus for testing tires including at least one rotatable load wheel having a spindle rotatable about a first axis; tire holding means rotatably mounting a tire and being movable to engage and disengage the tire with said load wheel, said tire holding means having a spindle rotatable about a second axis; and means for rotating said one load wheel whereby said tire and load wheel rotate together under load when so engaged, the improvement comprising:
   (a) first bearing means for rotatably supporting the load wheel spindle, said bearing having inner and outer races with said inner race rotating with said spindle;
   (b) first detector means for determining the speed of rotation of the load wheel spindle and inner race and for generating a first control signal in response thereto; and
   (c) first control means for rotating the outer race at a speed generally equal to the speed of the inner race and spindle in response to the first control signal generated by the first detection means to negate friction losses in the first bearing means.

2. The tire testing apparatus defined in claim 1 including:

(a) second bearing means for rotatably supporting the tire holding means spindle, said second bearing means having inner and outer races with said inner race rotating with said spindle;

(b) second detection means for determining the speed of rotation of the tire holding means spindle and inner race and for generating a second control signal in response thereto; and (c) second control means for rotating the outer race at a speed generally equal to the speed of the inner race and spindle in response to the second control signal generated by the second detection means to negate friction losses in the second bearing means.

3. The tire testing apparatus defined in claim 2 in which a sleeve is attached to the outer race of the second bearing means; and in which said sleeve is rotatably supported within a stationary housing by an outer bearing member.

4. The tire testing apparatus defined in claim 3 in which the sleeve is rotated by a motor for rotating the outer race of the second bearing means to negate friction losses in said second bearing means.

5. The tire testing apparatus defined in claim 2 in which the second detection means is an encoder and is operatively connected to the spindle of the tire holding means by a pair of sheaves and a connecting timing belt.

6. The tire testing apparatus defined in claim 4 in which the motor is operatively connected to the sleeve by a pair of sheaves and a connecting timing belt.

7. The tire testing apparatus defined in claim 4 in which a third detection means is operatively connected to the motor for determining the rotational speed of said motor and connected sleeve.

8. The tire testing apparatus defined in claim 1 in which the means for rotating the said one load wheel is an electric motor coupled to the spindle of said load wheel.

9. The tire testing apparatus defined in claim 1 in which the first detection means is an encoder operatively connected to the spindle of the load wheel.

10. The tire testing apparatus defined in claim 1 in which the first control means includes a motor drivingly connected to the outer race of the first bearing means for rotating said outer race.

11. The tire testing apparatus defined in claim 10 in which an encoder is operatively connected to the control means motor for measuring the rotational speed thereof.

12. The tire testing apparatus defined in claim 10 in which the control means motor is drivingly connected to the outer race of the first bearing means by a shaft coupled to said motor, a first gear mounted on said shaft and a second gear in mesh with the first gear, with said second gear being connected to a sleeve mounted on the outer race of the first bearing means.

13. The tire testing apparatus defined in claim 12 in which the outer race mounting sleeve is rotatably supported within a stationary housing by an outer bearing member.

14. The tire testing apparatus defined in claim 13 in which the outer bearing member has inner and outer races with said inner race being mounted on the sleeve for rotation therewith and said outer race being mounted on the housing.

15. The tire testing apparatus defined in claim 12 in which a third gear is mounted on the shaft and is in mesh with a fourth gear which is connected to a second sleeve rotatably mounted between a pair of inner and outer bearing members which are part of the first bearing means for rotatably supporting the load wheel spindle.

16. The tire testing apparatus defined in claim 15 in which said second sleeve of the first bearing means rotates an outer race of the inner bearing member at the same speed as the speed of an inner race of said inner bearing member which is attached to the spindle of the load wheel to negate friction losses in said inner bearing member.

17. The tire testing apparatus defined in claim 1 in which a second load wheel is freely rotatably mounted in a spaced relationship from said one load wheel and is adapted to assist said one load wheel in rotatably supporting the tire.

18. An apparatus for testing tires including at least one rotatable load wheel having a spindle rotatable about a first axis; tire holding means rotatably mounting a tire and being movable to engage and disengage the tire with said load wheel, said tire holding means having a spindle rotatable about a second axis; and means for rotating said one load wheel whereby said tire and load wheel rotate together under load when so engaged, the improvement comprising:

(a) bearing means for rotatably supporting the tire holding means spindle, said bearing means having inner and outer races with said inner race rotating with said spindle;

(b) detection means for determining the speed of rotation of the tire holding means spindle and inner race, and for generating a control signal in response thereto; and (c) control means for rotating the outer race at a speed generally equal to the speed of the inner race and spindle in response to the control signal generated by the detection means to negate friction losses in the bearing means.

19. The tire testing apparatus defined in claim 18 including:

(a) second bearing means for rotatably supporting the load wheel spindle, said second bearing means having inner and outer races with said inner race rotating with said spindle;

(b) second detector means for determining the speed of rotation of the load wheel spindle and inner race and for generating a second control signal in response thereto; and (c) second control means for rotating the outer race at a speed generally equal to the speed of the inner race and spindle in response to the second control signal generated by the second detection means to negate friction losses in the second bearing means.

20. A tire testing apparatus including at least one rotatable load wheel mounted on a spindle; tire holding means for rotatably mounting a tire and for moving said tire into engagement with the load wheel; motor means for rotating the load wheel spindle; a bearing member having inner and outer races rotatably supporting the load wheel spindle at each end of said spindle, said inner races being rotatable with said load wheel spindle; first means for determining the rotational speed of the inner races; and second means for rotating the outer races of the spindle at a speed generally equal to the rotational speed of the inner races to negate friction losses in the bearing members.

* * * * *